US009718557B2

(12) United States Patent
Zubairi (10) Patent No.: US 9,718,557 B2
(45) Date of Patent: Aug. 1, 2017

(54) FLIGHT DATA TRACKER (71) Applicant: Junaid Ahmed Zubairi, Hamburg, NY (US)

(72) Inventor: Junaid Ahmed Zubairi, Hamburg, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 585 days.

(21) Appl. No.: 14/158,176

(22) Filed: Jan. 17, 2014

(65) Prior Publication Data

US 2015/0203212 A1 Jul. 23, 2015

(51) Int. Cl.
*B64D 45/00* (2006.01)
*G08G 5/00* (2006.01)
*G07C 5/00* (2006.01)

(52) U.S. Cl.
CPC ...... *B64D 45/00* (2013.01); *B64D 2045/0065* (2013.01); *B64D 2045/0085* (2013.01);
(Continued)

(58) Field of Classification Search
CPC .... B64D 2045/0065; B64D 2045/0085; G07C 5/008; G07C 17/00; G07C 17/023;
(Continued)

(56) References Cited

U.S. PATENT DOCUMENTS 7,058,401 B1 * 6/2006 Sinivaara ........... H04B 7/18508
455/12.1

8,340,067 B2 * 12/2012 Buga ................. H04B 7/18506
370/338

(Continued)

*Primary Examiner* — Thomas G Black
*Assistant Examiner* — Sara Lewandroski
(74) *Attorney, Agent, or Firm* — Steven A. Wood (57) ABSTRACT When flights meet disaster in the mid-air, the cause of the mishap is unknown immediately. Teams are dispatched in difficult conditions to retrieve the flight data recorder (FDR) also known as black box. Until the black box is found, the exact cause of the crash cannot be determined. Sometimes it may take years to find the black box. For example, Air France flight 447 crashed into the Atlantic Ocean on Jun. 1, 2009. The cause of the accident remained unknown mainly because the black box was missing. It was found after almost two years in May 2011. The delay in finding the flight data creates risks for future flights if the crash occurred due to a manufacturing defect in the model of the plane. The ability to reach the data without the burden and need for a physical black box has obvious benefits. This idea has been discussed in the literature but no one has put forth a functional and effective method for the implementation of this concept, for example no one has determined an appropriate software scheme that would enable a universal system that doesn't need a black box or which can function in parallel with black box. In this project, a set of algorithms for reliable transmission of flight data in real-time to distributed ground servers is developed. The attached description presents an overall structure of the proposed scheme. We also describe the methods of communicating between at least one plane server, several data servers and at least one central server controlling various components of data transmission, and the algorithms that enable the communication of data. In addition, the proposed packet header formats, the packet type codes and fault tolerance features are described.

18 Claims, 11 Drawing Sheets

(52) U.S. Cl.
CPC ........... *G07C 5/008* (2013.01); *G08G 5/0004* (2013.01); *G08G 5/0013* (2013.01); *G08G 5/0082* (2013.01)

(58) Field of Classification Search
CPC  G07C 2200/00; H04B 7/155; H04B 7/15542; H04B 84/005; H04B 84/06; H04B 4/025; H04B 88/08; H04L 12/66; H04L 63/0272
USPC .............................................. 701/3, 14, 33.4
See application file for complete search history.

(56) References Cited

U.S. PATENT DOCUMENTS

| | | | | |
|---|---|---|---|---|
| 8,666,748 B2* | 3/2014 | Dong | ................... | G08G 5/0013 704/270 |
| 8,787,904 B1* | 7/2014 | Hayes | ................... | H04W 4/046 370/316 |
| 2004/0038185 A1* | 2/2004 | Ball | ........................ | G09B 9/08 434/29 |
| 2004/0058678 A1* | 3/2004 | deTorbal | ............... | H04W 36/32 455/437 |
| 2005/0065667 A1* | 3/2005 | Weineck | ............ | B64D 45/0015 701/3 |
| 2006/0229077 A1* | 10/2006 | Monk | .................... | H01Q 1/283 455/442 |
| 2008/0070517 A1* | 3/2008 | Brady | .................... | H04W 4/02 455/98 |
| 2008/0270020 A1* | 10/2008 | Raab | .................... | G08G 5/0013 701/533 |
| 2010/0103022 A1* | 4/2010 | Stefani | ................. | G08G 5/0013 342/30 |
| 2010/0167723 A1* | 7/2010 | Soumier | ............ | H04B 7/18506 455/431 |
| 2011/0149849 A1* | 6/2011 | Brownrig | ................ | H04L 45/00 370/328 |
| 2011/0189943 A1* | 8/2011 | Ilarregui | ............ | H04B 7/18508 455/7 |
| 2011/0276217 A1* | 11/2011 | Sim | ........................ | B64D 45/00 701/31.4 |
| 2012/0191273 A1* | 7/2012 | Jacobs | ............... | H04B 7/18508 701/3 |
| 2012/0310585 A1* | 12/2012 | Oliveira | ............. | B64D 11/0015 702/119 |
| 2013/0044611 A1* | 2/2013 | Jalali | ................... | H04B 7/18508 370/252 |
| 2013/0197725 A1* | 8/2013 | O'Dell | ................... | H04L 67/125 701/14 |
| 2013/0242864 A1* | 9/2013 | Vermande | ............. | H04W 40/20 370/328 |
| 2013/0244588 A1* | 9/2013 | Pereira | .................... | H04L 67/12 455/73 |
| 2013/0297103 A1* | 11/2013 | Baker | ................. | G08G 5/0013 701/14 |
| 2013/0317673 A1* | 11/2013 | Leroy | ................. | H04B 7/18506 701/14 |
| 2014/0075506 A1* | 3/2014 | Davis | ...................... | H04L 67/12 726/3 |
| 2014/0341107 A1* | 11/2014 | Abadie | ............. | H04B 7/18506 370/316 |
| 2016/0114902 A1* | 4/2016 | Pescod | ............... | H04B 7/18506 455/98 |

* cited by examiner

FIG. 3B
PLANE SERVER

Figure 4

Algorithm 3: Changing Servers
Start:
1. Assign ServerC = current server; ServerN=next server in line and PingCount = 0;
2. Ping ServerC and ServerN
3. If ping response received from both servers then
   a. Assign T1 = ServerC response time
   b. Assign T2 = ServerN response time
   c. If (T1 > T2) then
      i. Assign ServerC = ServerN
      ii. Assign ServerN = ServerN+1
4. else
   a. if ping response received from ServerN then
      i. do steps 3.c.i and 3.c.ii
   b. else if ping response not received from both servers then
      i. PingCount = PingCount+1
      ii. If (PingCount == 10) then send PANIC to Main Server
      iii. else go back to step 2
End.

Fig. 4. Algorithm 3: Changing Server

Figure 4 cont. (text version)

Figure 5A

Algorithm 4: Data Server Algorithm

Start:

1. Get msg; determine source
2. if it is HANDSHAKE from Main Server; establish soft state for a specific flight
3. else if it is data packet then
   a. Process msg from Plane Server
   b. Send ACK to Plane Server
   c. Check if duplicate else save msg in buffer
   d. Transmit msg to Main Serve for integrated archival
4. else if msg type is END TRANSMISSION, close the connection End.

FIG. 5B
DATA SERVER

| Flight # | Departure Date | Black Box ID | Packet # |
|---|---|---|---|

Figure 6

```
data4       header.h
zubairi@eve:~/flight/ver5.0$ ./runit
MAIN: Got initial handshake packet from Plane server ==>C0 PLANE: ************ B
BOX#12-345-6789AB
MAIN: Route Inquiry was sent
PLANE: Received Route Inquiry from main server
MAIN: Got Route from Plane server and here it is ==>RP PLANE: ************ BBOX#
12-345-6789AB UNITED796 BUFFALO TO CHICAGO START TIME: 1352522566 715105
MAIN: List of Small Servers was sent
PLANE: Received Server List ==> S1 MAIN: S1-LONDON ON S2-DETROIT MI S3-SOUTH BEN
D IN S4-CHICAGO IL
DATA1: Data server got initial handshake packet from Plane server
PLANE: Transit time data server 1 and plane server: 0 sec  39 usec
PLANE: Unable to establish connection, switching to next server...
DATA3: Data server got initial handshake packet from Plane server
PLANE: Transit time data server 3 and plane server: 0 sec  41 usec
DATA4: Data server got initial handshake packet from Plane server
PLANE: Transit time data server 4 and plane server: 0 sec  42 usec
PLANE: Flight Completed.....Now exiting
zubairi@eve:~/flight/ver5.0$
```

Figure 7: Fault Tolerant Operation of Flight Tracker

FLIGHT DATA TRACKER

FIELD OF THE INVENTION

This invention relates generally to the field of flight data system, and more particularly, to the system for transmitting and retrieving flight data.

BACKGROUND OF THE INVENTION

When flights meet disaster in the mid-air, the cause of the mishap is unknown immediately. Teams are dispatched in difficult conditions to retrieve the flight data recorder (FDR) also known as black box. Until the black box is found, the exact cause of the crash cannot be determined. Sometimes it may take years to find the black box. For example, Air France flight 447 crashed into the Atlantic Ocean on Jun. 1, 2009. The cause of the accident remained unknown mainly because the black box was missing. It was found after almost two years in May 2011.

The flight data recorder recovery is often a difficult job. Teams are dispatched to look for it in rough terrain and sometimes under the ocean. The delay in finding the flight data creates risks for future flights if the crash occurred due to a manufacturing defect in the model of the plane.

The current paradigm of saving important data into a black box has many shortcomings, particularly the difficulties in trying to find it after an accident. Therefore, some have explored the feasibility of transmitting data to ground servers in real time. The ability to reach the data without the burden and need for a physical black box has its apparent benefits. This idea has been discussed in the literature but no one has put forth a functional and effective method for the implementation of this concept, for example no one has determined an appropriate software scheme that would enable a universal system that doesn't need a black box or which can function in parallel with black box.

SUMMARY

A distributed data transmission and storage system for flight data in civil aviation planes with separately identifiable plane, data and control server modules.

The system in claim 1 with the addition of flight routing module to identify the distributed data servers on the ground that would take part in receiving and processing flight data between the origin and destination airport.

An embodiment of the system in claim 1 using C language programs running on Linux machines for test and simulation purpose.

An optional application of 1-of-N transmission principal to system in claim 1 to save bandwidth when satellite communication is used so that out of every N samples, only one is transmitted to the ground.

The system in claim 1 with the addition of fault tolerance so that any communication failure between the flight and the current ground server would trigger a switch to satellite communication to the next ground server on the path of the flight.

This summary is provided to introduce key concepts in a simplified form that are further described below in the "Detailed Description of the Invention" with "Description of Figures".

In this disclosure, a distributed data transmission protocol and specified packet header formats for communication between plane and ground servers are described as flight data tracker. A method communicating between ground resources and planes is described, and a set of algorithms is offered that have been developed to packetize the flight data, transmit it to the ground to an array of servers and integrate the transmitted data to recover the flight information. The intention is to contribute towards saving human lives and improving the safety and reliability of the aircraft control system and aircrafts.

DESCRIPTION OF THE FIGURES

FIG. 8 Message Types in Flight Data Tracker identifying the two letter codes developed for this system and their meanings.

DETAILED DESCRIPTION OF THE INVENTION

If the flight data is transmitted in real-time to the ground in addition to being saved in the black box, the data would be available instantly in case of a crash. This idea has been explored in the literature. However, no communication scheme, and its associated software, has been specified in the literature for the development of universal flight data transmission system.

A set of algorithms for reliable transmission of flight data in real-time to distributed ground servers is developed. This description presents an overall structure of the proposed scheme. We also describe the methods of communicating between at least one plane server, several data servers and at least one central server controlling various components of data transmission, and the algorithms that enable the communication of data. In addition, the proposed packet header formats, the packet type codes and fault tolerance features are described.

Figure 1:
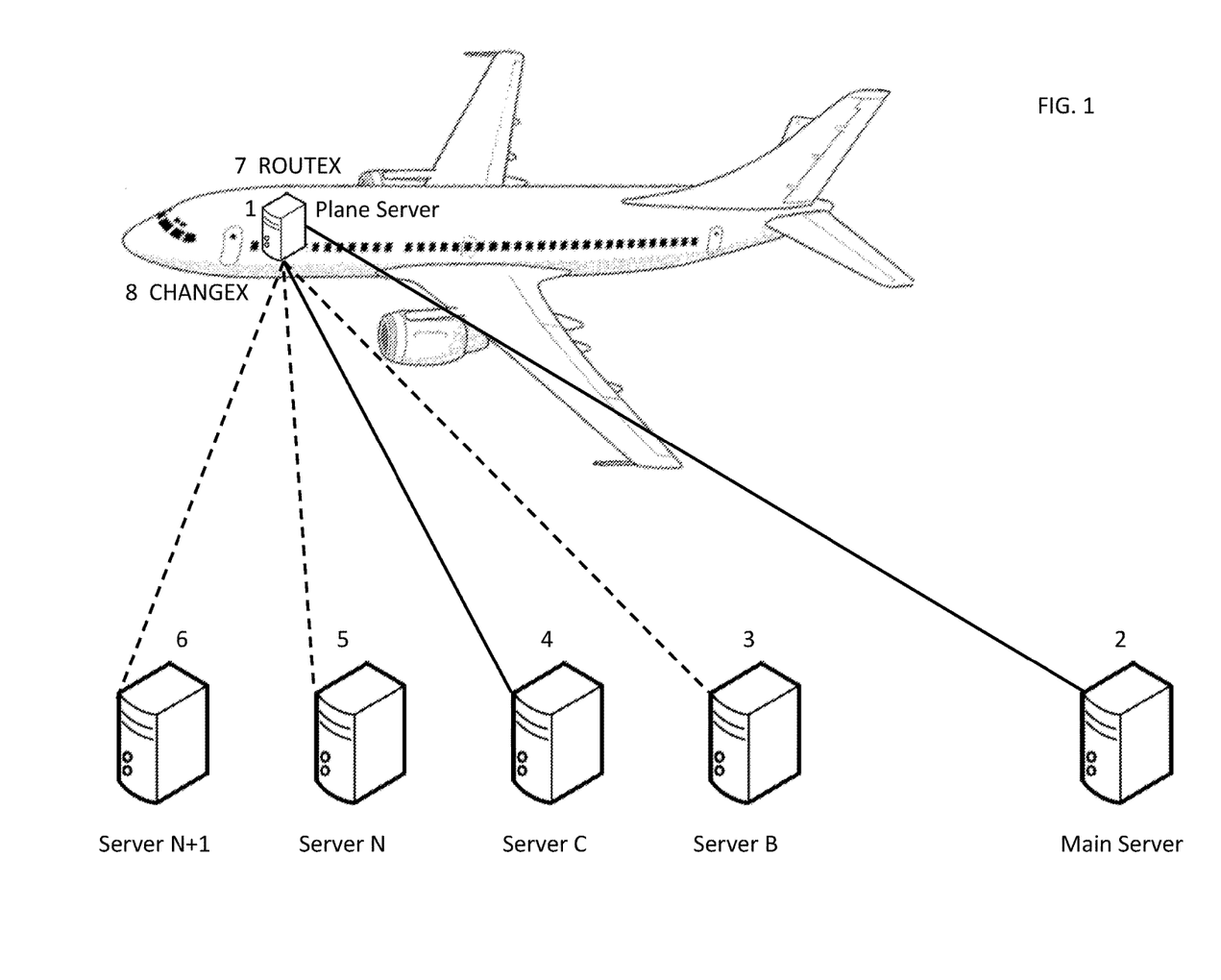
FIG. 1. This figure shows one embodiment of the system showing Plane, Data and Main Servers during flight. The solid lines show current connections between the plane server and the other servers. Longer distances would need additional data servers which are identical to the ones shown. Numbered entities are explained here. 1 is the plane server, 2 is the main server, 3,4,5,6 are ground based data servers, 7 is the ROUTEX algorithm that calculates the ground based servers once the origin and destination airports of a flight are decided and 8 is the CHANGEX algorithm that would change the target of the flight data from one ground based server to the next off the list when the plane enters the UHF range of the next server.

The overall structure of the proposed distributed flight data transmission system is described. The structure of the system is depicted in FIG. 1. Our implementation scheme proposes an elaborate system consisting of one plane server, one controller server on the ground and several distributed servers on the ground.

FIG. 1 is one embodiment of the system in which four data servers are shown. The number of data servers is variable and it is based on the distance covered by the flight. On initialization, the plane server 1 contacts the controller server 2 at the origin of the flight and informs the server 2 about the destination. The controller server 2 identifies and makes available an array of distributed data servers (3, 4, 5, 6 . . . ) on the ground located approximately 150-200 miles apart on the route from origin to destination. The controller server 2's negotiations with the distributed servers contain the approximate time window of usage which can be recorded as a "soft" state by the distributed servers. The plane server 1 starts transmitting flight data to controller server 2 during taxiing and later to the first server off the list. As the flight progresses, plane server 1 hands off and connects to the next server in the array until it reaches the destination. Each distributed server transmits its portion of flight data back to the main server 2 which integrates the data for retrieval after the flight.

Plane, Main and Distributed Servers.

Figure 2A:
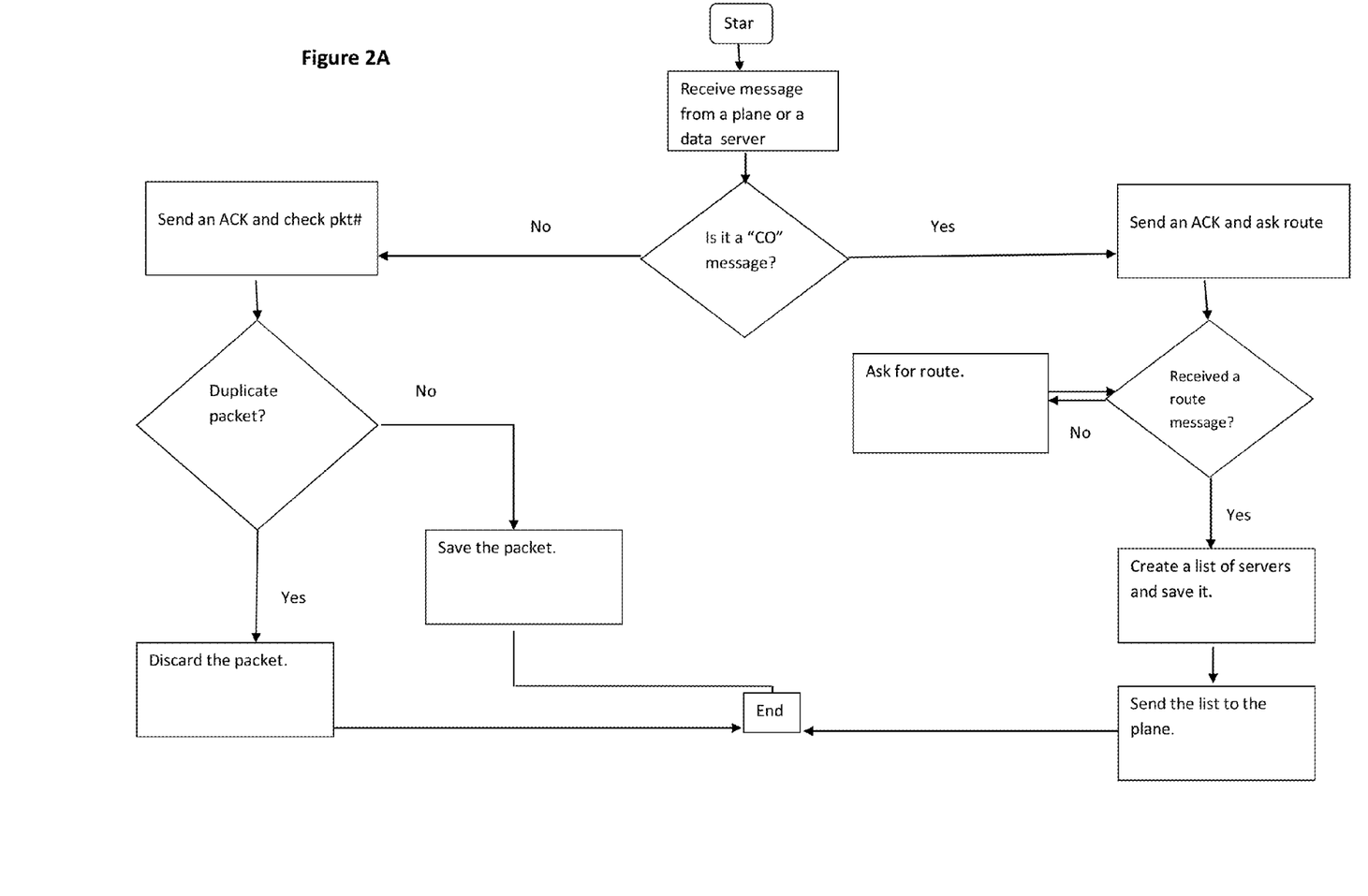
FIG. 2A. Algorithm 1: Main Server simplified flowchart showing the progress from starting up to flight monitoring.

Main server 2 has two major responsibilities. First one is to create a list of data servers that the plane will go through with respect to its route. For creating this list, the main server 2 runs the ROUTEX 7, a modified form of Dijsktra's shortest path routing. This algorithm connects neighboring airports with links representing distances and calculates the route and the intermediate airports between the source and the destination. This algorithm can be tuned to specific flight routing considerations by modifying the link costs. ROUTEX 7 has been tested successfully with a subset of airports. The set of intermediate airports is identified and sent to the plane server 1 and distributed servers alerting them to the approximate time of plane arrival in their zone. Second responsibility is receiving messages from the data servers. The messages contain flight data that will be integrated in the main server 2. The main server 2 algorithm (Algorithm 1) is shown in FIG. 2A and narrated below.

Figure 2B:
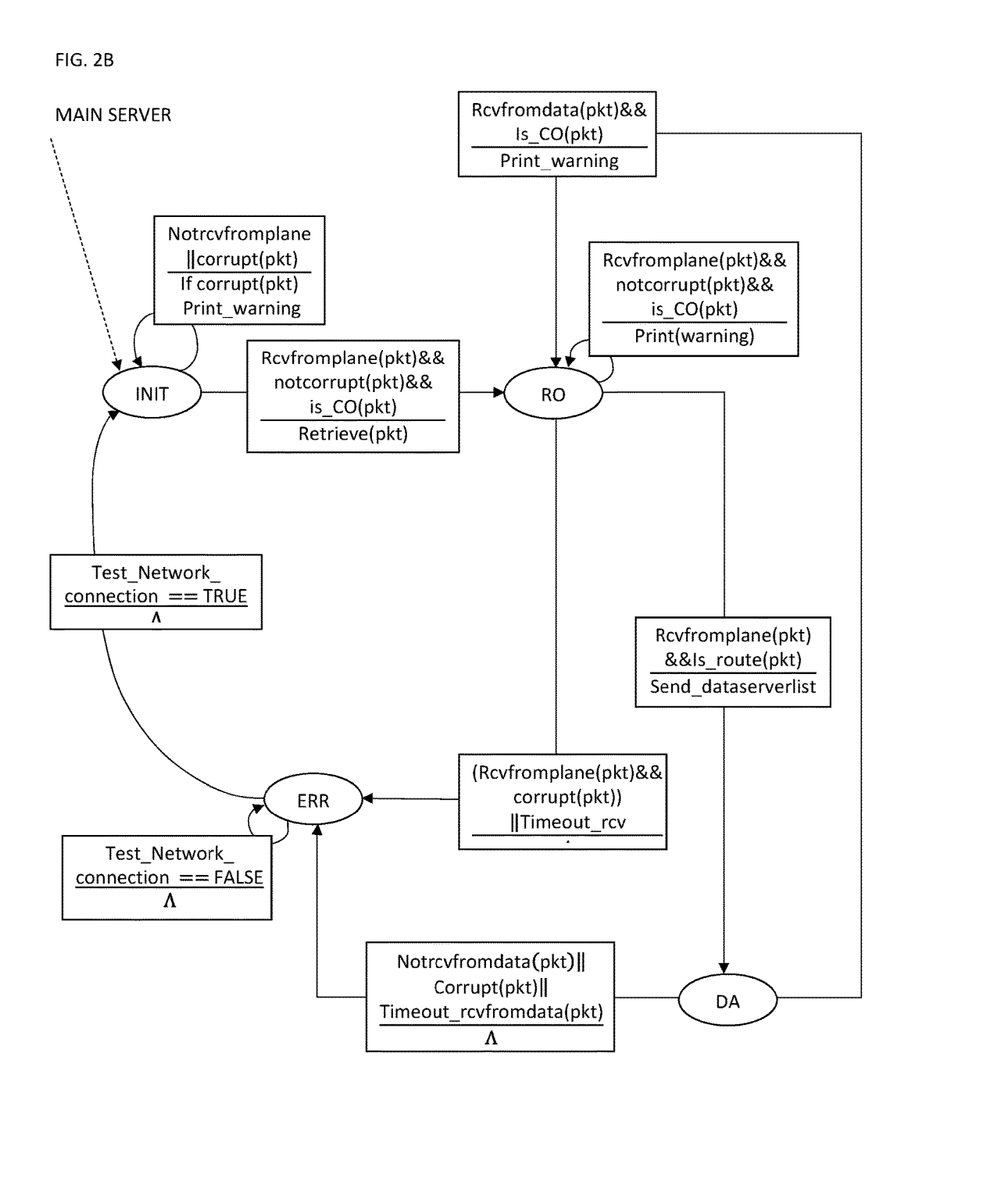
FIG. 2B. Finite State Machine Design for Main server showing the four states (INIT, RO, DA and ERR) and their associated actions and transitions. INIT is the initial state in which the main server expects to get the CO control packet from the plane server. Once the packet is received successfully, the main server advances into the RO state in which it sends the destination query to the plane and waits for the response. Once the list of ground servers on the path is sent to the plane server, the main server would go into DA state in which it will get the data from the ground based data servers and integrate it for each specific flight. ERR state handles errors including corrupted packet and unexpected packets. In the ERR state, the connectivity issues would be resolved.

Algorithm 1:

Main Server 2: Start: (1) Receive msg; determine source; (2) If (msg==CO) then a. Send ACK, b. Send ROUTE QUERY, c. Get ROUTE info, d. HANDSHAKE with data servers on route, e. Send list of data servers on route to plane; (3) else then a. extract DATA from msg, b. check packet number; if duplicate discard, c. else save DATA in buffer; End. The finite state machine diagram of the main server 2 is shown in FIG. 2B. It covers all the different events and the actions taken in response to events in order to operate as a robust fault tolerant system.

As seen in FIG. 2B, the main server 2 can recover from multiple failure conditions including any timeouts or loss of connectivity. In addition to the control and data packets, main server may optionally receive heartbeat messages from the data servers and planes. If the message is identified as "CO", it is the initial message from a plane. An acknowledgement and a request for the route are sent back. Based on the next message, if the route is sent, a list of data servers is created with respect to the route indicated in the message. If it's not a route message, request for the route is periodically sent. Message type codes are embedded in the headers and their meanings are indicated in Table 1.

If the message received by the main server 2 is a DA message, it is sent by one of the data servers and consists of flight data. Since the flight duration and arrival time is calculated on take-off, packets containing the flight data are pre-numbered. In fact, the number of expected packets per flight is also fixed. This feature lets main server 2 decide where the packet is placed in the buffer. Packets carrying the flight data received for the first time will be saved. Flight data is integrated and made available by the main server 2 for data retrieval and analysis after the completion of flight message is received from the last server in the list. If the flight could not be completed due to a disaster, the flight data would be invaluable in determining the cause of the disaster in a very short time.

Plane Server 1 Algorithm.

Figure 3A:
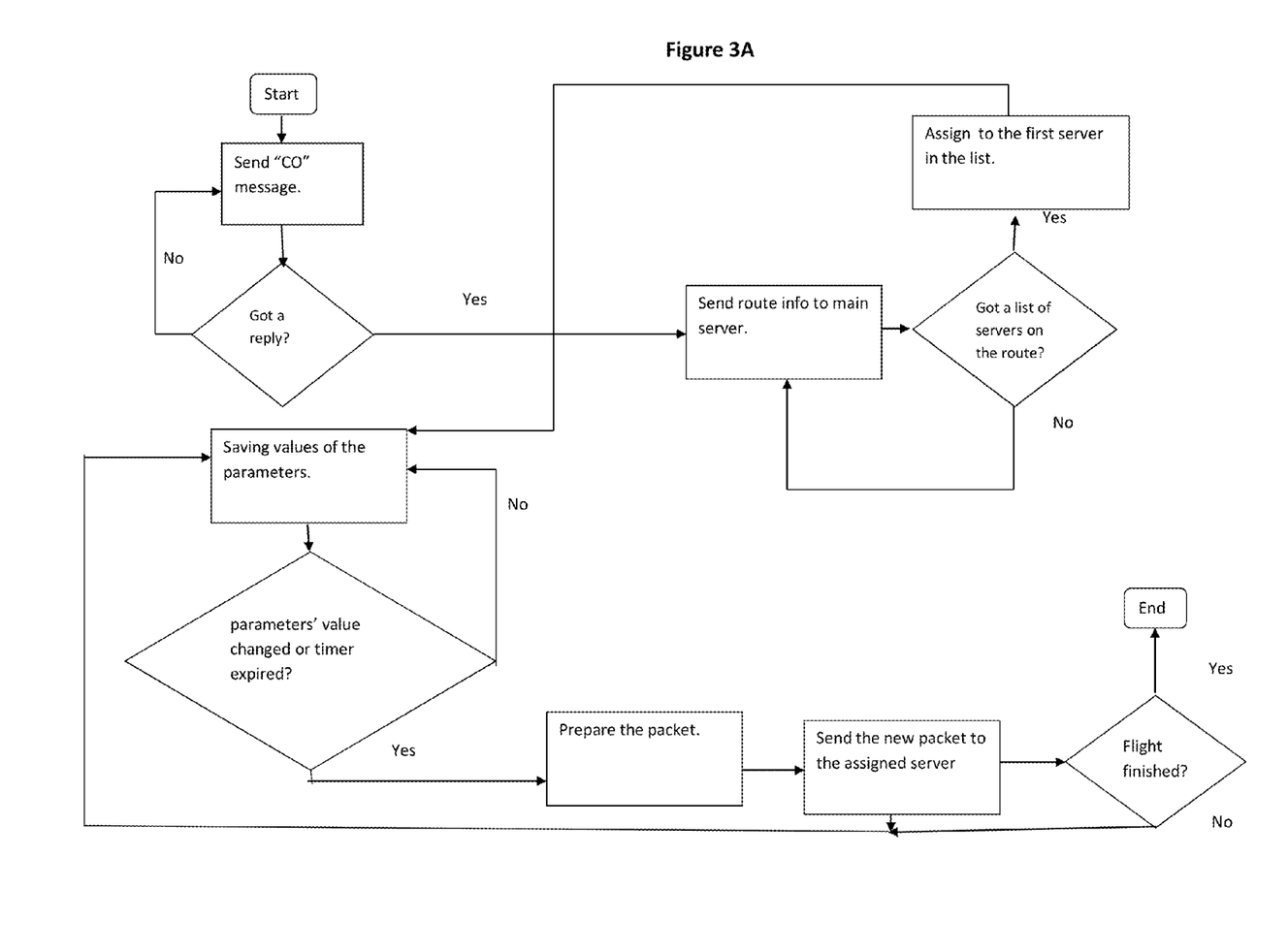
FIG. 3A. Flow chart of Algorithm 2: Plane Server simplified flowchart showing the progress from starting up to ending the flight.
Figure 3B:
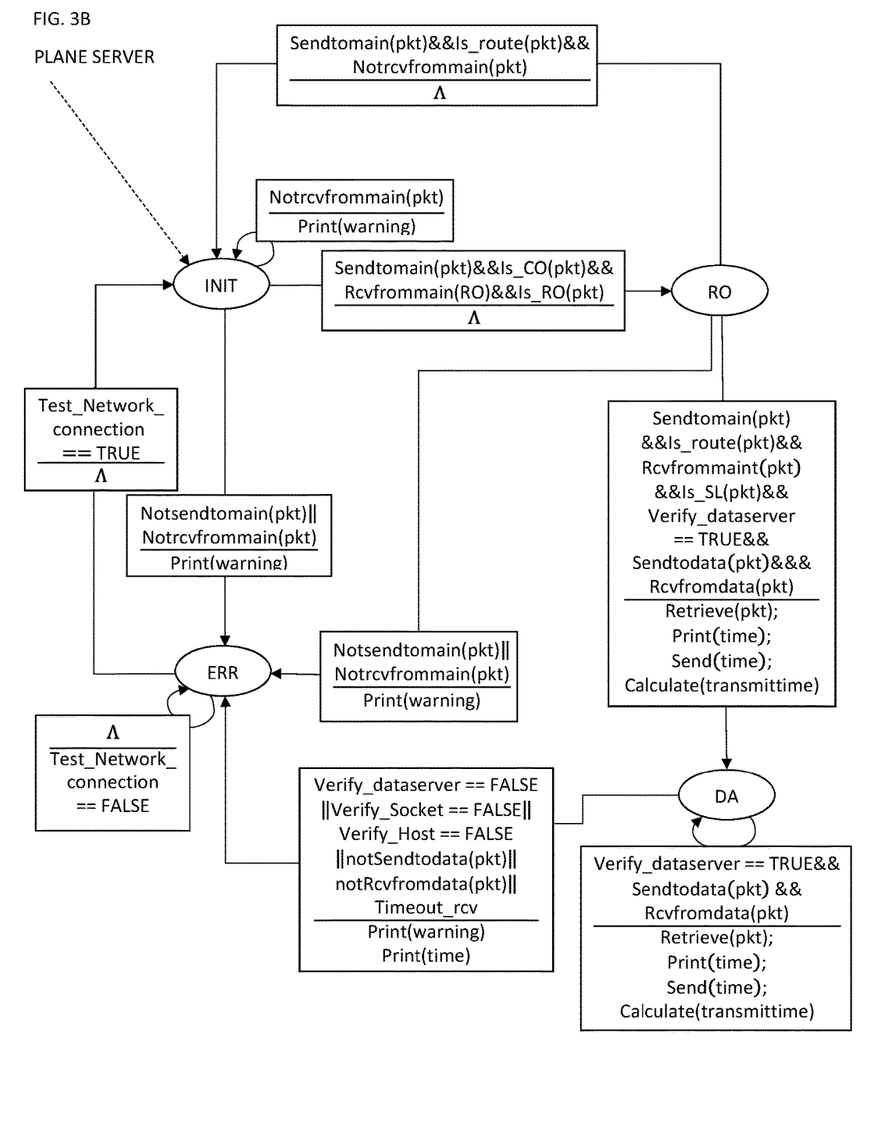
FIG. 3B. Finite State Machine Design for Plane Server showing the four states (INIT, RO, DA and ERR) and their associated actions and transitions. These states correspond to the states as discussed in FIG. 2B explanation with respect to the plane server.

Plane server 1 sends packets containing flight information to the data servers. The Plane Server 1 algorithm is depicted in FIG. 3A. The data received and saved by the data servers and the main server 2 is created and delivered by the plane. There are two types of packets sent by the plane server 1. The first one is a CO message, which means the plane is ready for flight and waiting for the route list. The second type is the regular packet containing flight related data. Plane server 1 saves values of the parameters in its send buffer but some of the parameters values are not frequently changing because of their nature. For this kind of data, timer is used. Timer counts for a specific amount of time. If the timer expires, the parameter value is sent whether its value is changed or not. Plane server 1's second responsibility is being able to assign itself to the data servers to send data and change the data server in use when needed. As the data servers are only capable of receiving data in a limited area, plane must change servers from time to time. This function is done by using the server list and round trip time values that indicate the relative distance from the data servers if direct communication channel is used. If the communication is via satellite because the plane is flying over ocean, virtual data servers can be used to distribute the data. The finite state machine diagram of the plane server 1 is shown in FIG. 3B.

It covers all the different events and the actions taken in response to events in order to operate as a robust fault tolerant system.

CHANGEX 8 Algorithm (Algorithm 3).

Figure 4:
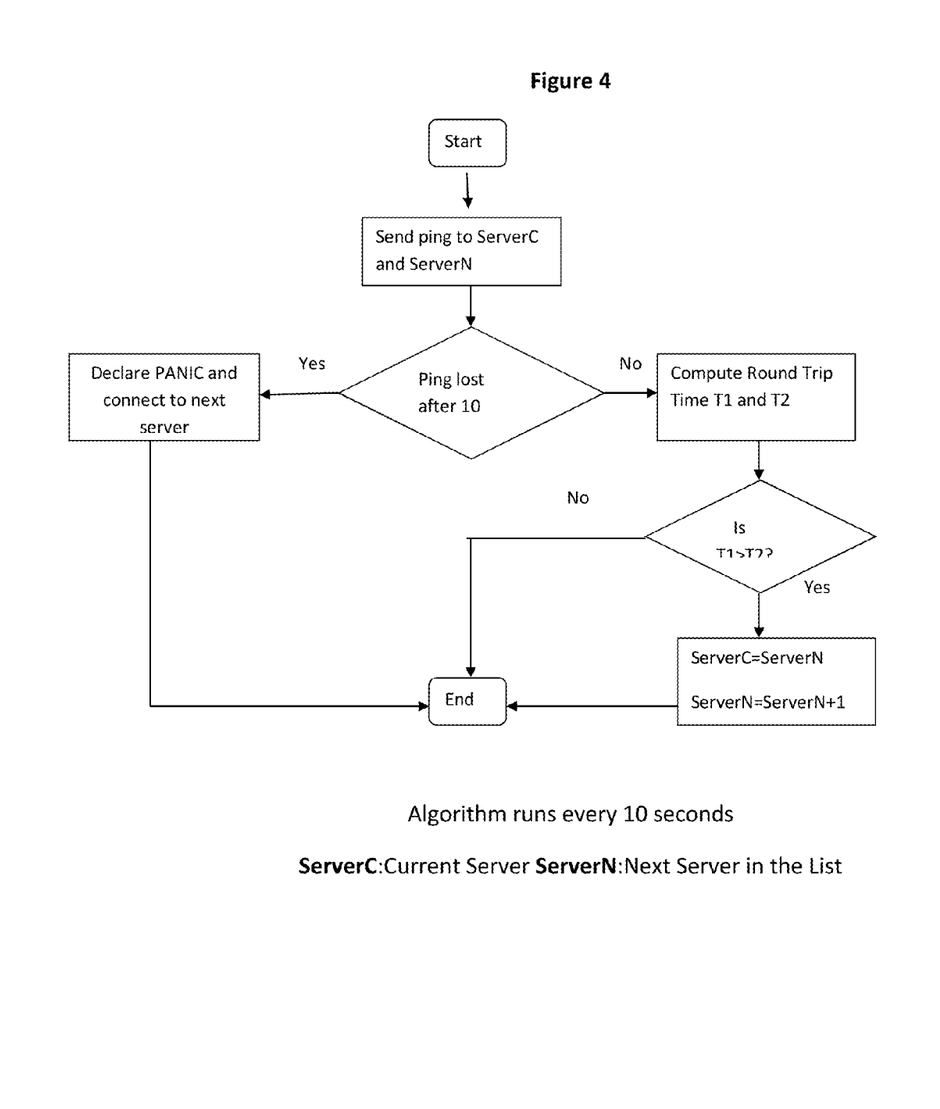
FIG. 4. Algorithm 3: CHANGEX Changing Server Algorithm showing the control loop and the resulting actions.

At take-off, the location and number of distributed data servers is calculated. Due to unforeseen circumstances, the flight may not reach the server zones at the exact pre-calculated time therefore it is important to build an algorithm that pings the data servers periodically and changes the destination of data. This algorithm is named CHANGEX 8 and shown in FIG. 4. A control message is sent to the current data server which is assigned to the plane and represented by ServerC and to the next server which is the next server in the list of servers represented by ServerN. If the control message is lost on both servers for ten consecutive attempts, it is assumed that there is a communication problem and the algorithm returns, triggering re-connection attempts at the lower level. It is shown in FIG. 4 with PANIC signal. Otherwise, round trip time is calculated based on the results of the control message. T1 represents the round trip time for the ServerC and the T2 represents the round trip time for the ServerN. If T1's value is larger than T2's value a server change is made. ServerN becomes the new ServerC and the server after the ServerN in the list replaces the current ServerN. As shown in FIG. 4, the algorithm also specifies what happens if only one server responds to the control message.

Algorithm 3: Changing Servers (CHANGEX 8):

Start: (1) Assign ServerC=current server; ServerN=next server in line and PingCount=0; (2) Ping ServerC and ServerN; (3) If ping response received from both servers then, a. Assign T1=ServerC response time, b. Assign T2=ServerN response time, c. If (T1>T2) then, i. Assign ServerC=ServerN, ii. Assign ServerN=ServerN+1; (4) else, a. if ping response received from ServerN then, i. do steps 3.c.i and 3.c.ii, b. else if ping response not received from both servers then, i. PingCount=PingCount+1, ii. If (PingCount==10) then send PANIC to Main Server, iii. else go back to step 2; End.

Data Server Algorithm (Algorithm 4).

Figure 5A:
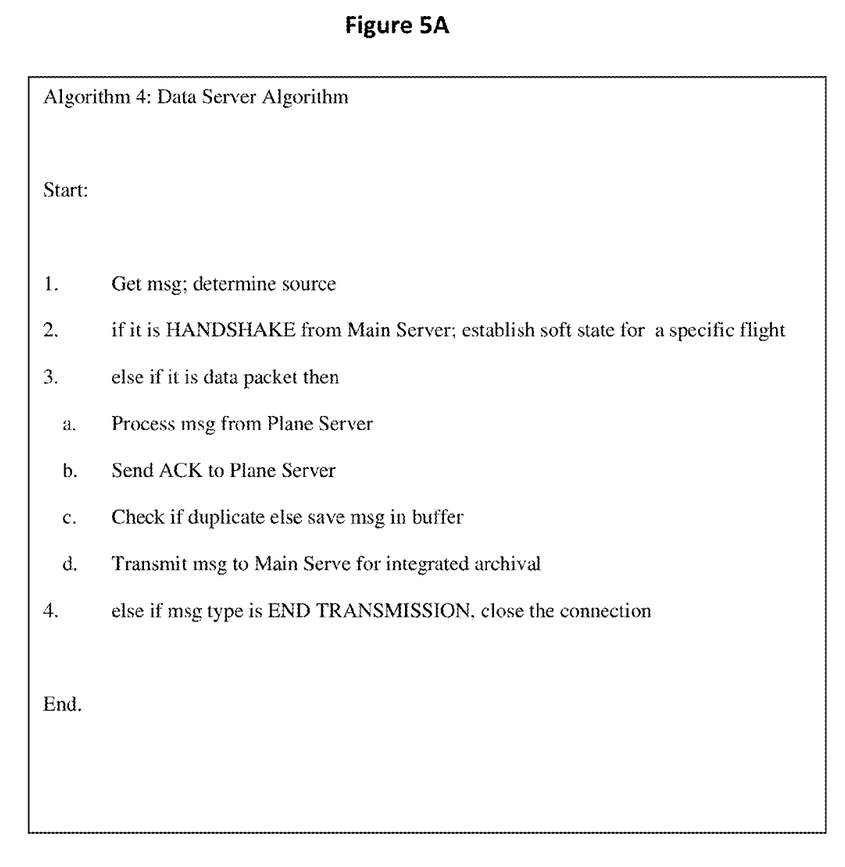
FIG. 5A. Algorithm 4: Data Server Algorithm represented in simplified pseudocode.

Distributed data servers receive the control packets from the main server 2 or data packets from the plane and direct them to the main server for assembly and archiving. The data server performs handshake with the main server for keeping a soft state for a flight. As shown in FIG. 5A, data server receives a data message from the airplane, sends an acknowledgement and checks the packet sequence. If the newly received packet sequence number matches an already received packet, it is discarded, else the packet is saved.

Figure 5B:
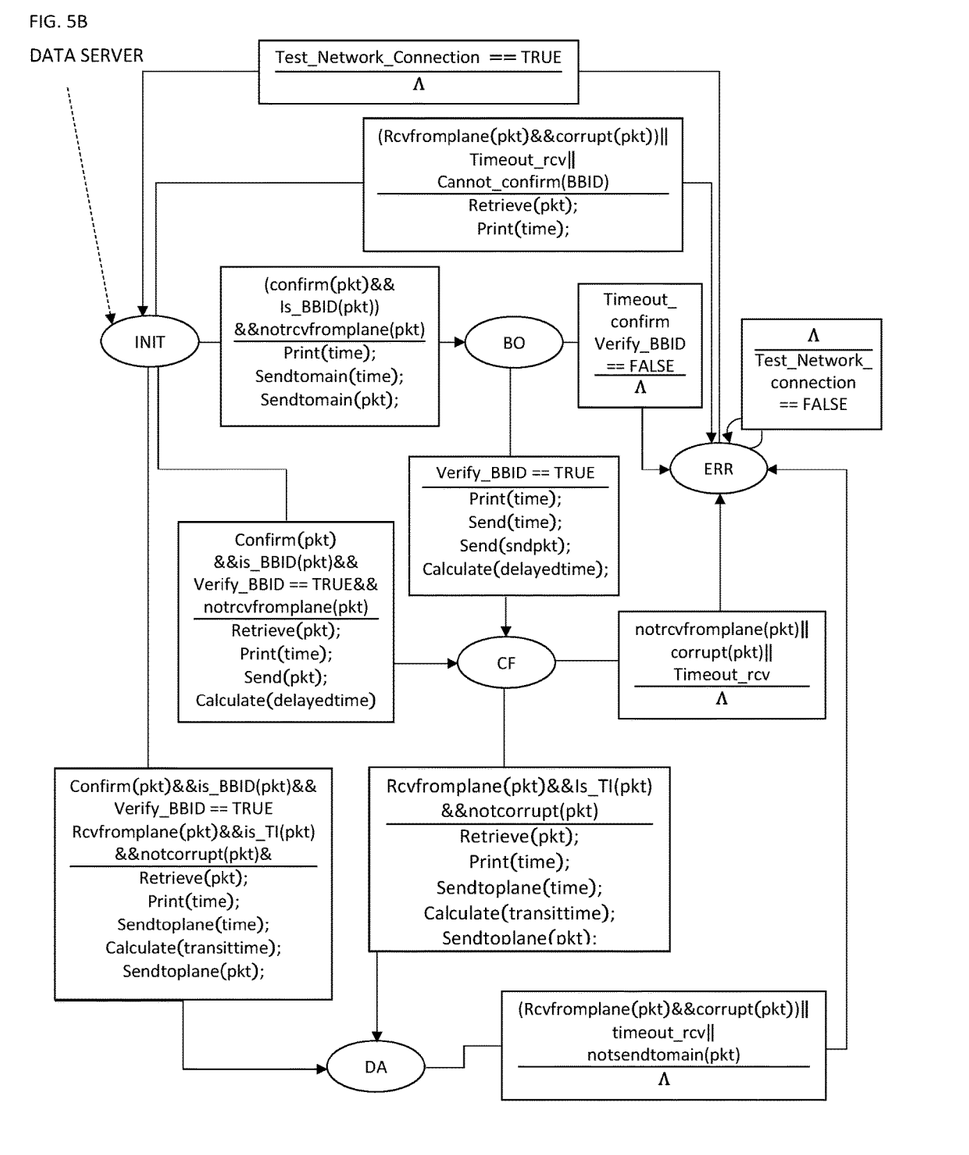
FIG. 5B. Finite State Machine Design for Data Server showing the five states (INIT, BO, CF, DA and ERR) and their associated actions and transitions. The BO state is to confirm the black box ID of the plane and the CF state is for calculating the time delay between the plane server and the data server. Rest of the states correspond to the states as discussed in FIG. 2B explanation with respect to the data server.

Algorithm 4: Data Server Algorithm:

Start: (1) Get msg; determine source; (2) if msg type is HANDSHAKE from Main Server; establish soft state for a specific flight; (3) else if msg type is DATA then, a. Process msg from Plane Server, b. Send ACK to Plane Server, c. Check if duplicate else save msg in buffer, d. Transmit msg to Main Serve for integrated archival; (4) else if msg type is END TRANSMISSION, close the connection; End. The finite state machine diagram of the data server is shown in FIG. 5B. It covers all the different events and the actions taken in response to events in order to operate as a robust fault tolerant system.

The flight tracker is designed to be fault tolerant to avoid any problems in working with many servers. The system works with one airborne server, one ground based control server and several ground based data servers. Therefore, it is imperative that the system continues to work even if faults are developed in any of the multiple servers.

Fault tolerance is achieved by decoupling the lower level communication from the upper level programs. The system utilizes a separate module to continuously test the connectivity of the airborne server to the ground based facilities. In case of any serious problem in communicating with the currently selected ground based server, the system moves on to handshake with the next server in line in order to continue the transmission.

The plane server 1 is a process which can be duplicated for redundancy as it can be configured to run off the black box or the central gateway node inside the plane. Both the black box and the gateway node are capable of running the plane server process thus obtaining fault tolerance for the plane server.

Another feature relates to the update frequency for certain type of data. Since some data is constant over a long period of time, sending it repeatedly is a waste of resources. For example, heading and speed of the aircraft, outside temperature and altitude above the ground may remain constant in long flights during auto-pilot mode. Therefore, timers can be associated with such data so that new values are sent only when they change abruptly or if the timer runs out. Fault tolerance is achieved in data storage as each data server keeps its copy of the data as well as forwards it to the main controller server 2 that assembles complete data at touchdown of the aircraft and makes it available for data mining and post flight analysis. Therefore backup storage of data is available for 12 to 24 hours at the distributed servers.

1-of-N Collection:

Switching to satellite communications at any stage in the flight increases the financial cost to the airline. Flights over vast stretches of desert and wide oceans are forced to use satellite links. In Flight Tracker, it is recommended to optionally use 1-of-N strategy to reduce the cost of using satellite links. In 1-of-N method, one out of every N values is transmitted thus reducing the bandwidth usage by a factor of 1/N.

Data Requirements and Packet Headers.

Next, we discuss the data types and bandwidth requirements and specify the packet headers for transmitting the data. Data to be sent, received and recorded are the parameters that a regular black box device stores. They are mandated by Federal Aviation Administration (FAA). There are 88 parameters mandated to be tracked for transport airplanes. Based on the detailed description of parameters in ICAO documents, total bandwidth is calculated for every parameter listed. Calculations show that approximately 1.80 Kbps bandwidth is needed for the 88 parameters. It is a reasonable value to allocate for the transmission of single flight data.

To prevent entry duplications and out of order savings of the data, a flight data packet header is developed which can be placed underneath the UDP header. This header is a part of the data part of the datagram and completely independent of the UDP header. This header would only be processed by the servers that receive data.

Figure 6:
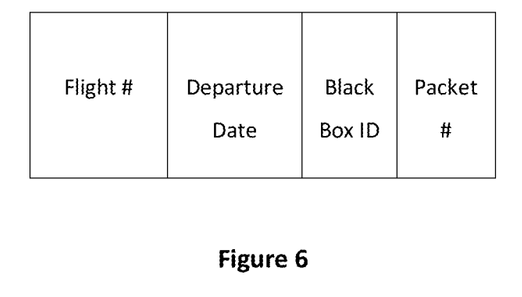
FIG. 6. Flight Data Header showing the field titles their respective sequence in the header. The black box ID and the departure date uniquely identify a flight out of thousands of flights on any given day. Packets are given sequence numbers assuming the expected data volume and the duration of the flight are pre-calculated.

As shown in FIG. 6, the flight data header consists of 4 parts: (1) Flight Number: This 3-byte field identifies the distinguishing number of the flight; (2) Departure Date: This 4-byte field identifies the date the flight departs; (3) Black Box ID: It identifies the unique identification number/serial number of the black box. Length of this filed is 4 bytes; (4) Packet No: The sequence number of the packet. It is used to prevent the redundant recording of a packet and for ordering the packets received. Length is 4 bytes.

A three tier system is specified in which the distributed data collection servers are controlled by the main server that coordinates with the plane server for flight data transmission. Reliability and fault tolerance are added without using TCP to prevent large variations in the rate of data transmission. Flight data packet headers and packet types are defined to accommodate all 88 parameters that are recorded using flight data recorders.

Examples of System at Work

The following description will provide specific examples of the present invention. Those skilled in the art will recognize that routine modifications to these embodiments can be made which are intended to be within the scope of the invention.

In one embodiment, the flight tracker has been implemented on Linux platform for test and simulation purposes. Currently the main algorithms are designed and prototype software in C language is functional on simulated servers. The system consists of main server (mainserver.c), plane server (plane.c) and a set of data servers (dataserverN.c where N designates the sequence number of the data server).

Flight tracker version 1.0 allows control messages and data transfer between plane and main server. Version 1.1 removes command line arguments and binds servers to fixed port numbers for automated simulation runs. Version 2.0 and 3.0 introduce data servers that receive data packets from the plane server and complete the data transfer from the plane server to data servers and the main servers. Version 4.0 expands the system functionality by allowing creation of data files by data and main servers. The outputs from test runs of the system are shown below as Case I: Fault Free operation and Case II: Fault Tolerant Operation.

---
CASE I: Fault Free Operation
--- zubairi@eve:~/flight/ver4.0$ ls -al *.c
-rw-r--r-- 1 zubairi users 6399 2012-06-10 12:15 dataserver1.c
-rw-r--r-- 1 zubairi users 6432 2012-06-10 12:15 dataserver2.c
-rw-r--r-- 1 zubairi users 6386 2012-06-10 12:15 dataserver3.c
-rw-r--r-- 1 zubairi users 6401 2012-06-10 12:16 dataserver4.c
-rw-r--r-- 1 zubairi users 5880 2012-06-10 12:58 mainserver.c
-rw-r--r-- 1 zubairi users 7870 2012-06-10 12:52 plane.c
zubairi@eve:~/flight/ver4.0$ ./build
zubairi@eve:~/flight/ver4.0$ ./runit
MAIN: Got initial handshake packet from Plane server ==>C0
PLANE: ************ BBOX#12-345-6789AB
MAIN: Route Inquiry was sent
PLANE: Received Route Inquiry from main server
MAIN: Got Route from Plane server and here it is ==>RP PLANE:
**********#BBOX 12-345-6789AB UNITED796 BUFFALO TO CHICAGO START TIME: 12:14 **********
MAIN: List of Small Servers was sent
PLANE: Received Server List ==> SL MAIN: S1-LONDON ON S2-DETROIT MI S3-SOUTH BEND IN S4-CHICAGO IL
DATA: Data server got initial handshake packet from Plane server
PLANE: Transit time data server 1 and plane server: 0 sec 38 usec
PLANE: Transit time data server 2 and plane server: 0 sec 42 usec
PLANE: Transit time data server 3 and plane server: 0 sec 50 usec
PLANE: Transit time data server 4 and plane server: 0 sec 45 usec
PLANE: Flight Completed.....Now exiting

---

Case II: Fault Tolerant Operation

Fault tolerance is achieved by decoupling the lower level communication from the upper level programs. The system utilizes a separate module to test the connectivity of the airborne server to the ground based facilities. In case of any serious problem in communicating with the currently selected ground based server, the system moves on to handshake with the next server in line in order to continue the transmission. The screenshot in FIG. 7 illustrates this feature.

Figure 7:
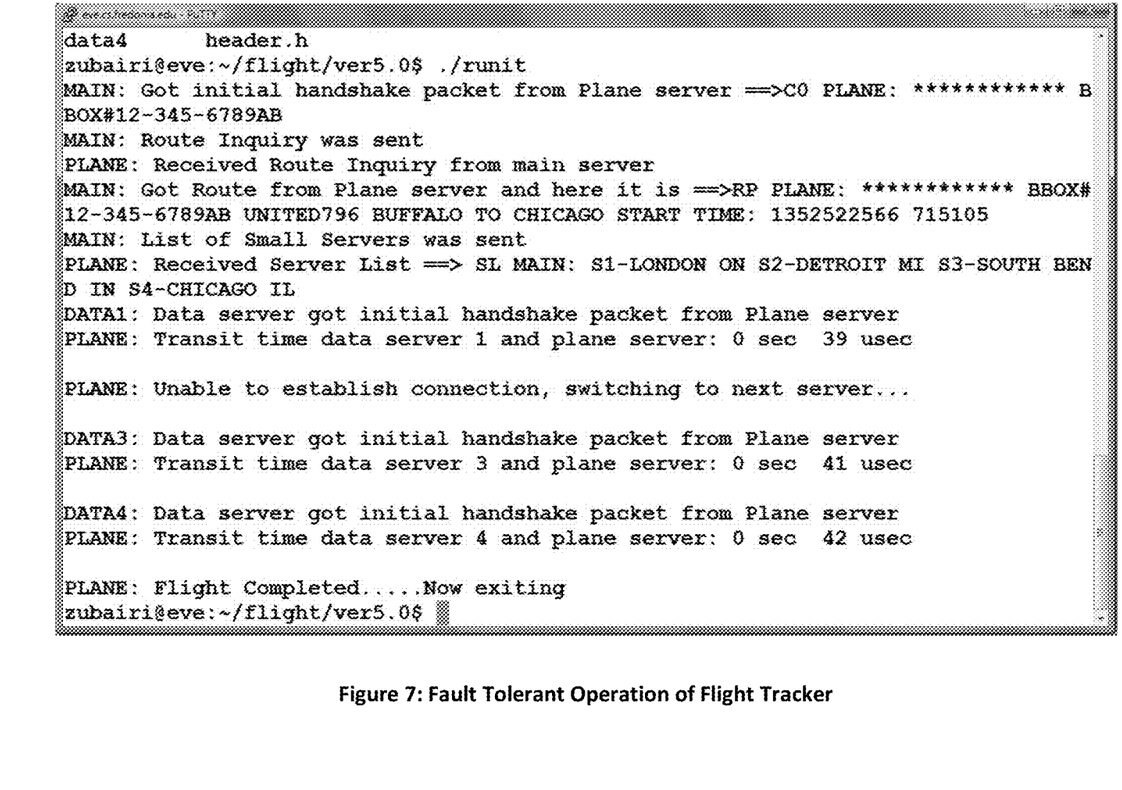
FIG. 7. Fault Tolerant Operation of Flight Data Tracker showing how the tracker switches to next data server when the connection with the current one can no longer be sustained.

In one embodiment of the system, FIG. 7 shows the communications of the plane server with ground based servers on a flight from Buffalo, N.Y. to Chicago, Ill. This flight has marked four data servers on the ground namely London (Ontario), Detroit (Michigan), South Bend (Indiana) and Chicago (Illinois). The main server can be located at Buffalo N.Y. (Origin) or Chicago Ill. (destination). The S2 data server at Detroit could not be contacted by the plane and after repeated attempts, it moves on to select the next server in line. Since the communication to the nearest server was through UHF radio link, the communication failure would mean that S3 would be automatically connected via SAT-COMM (satellite communications) since S3 is currently too far to be accessible by the radio link.

The invention claimed is:

1. A fault-tolerant method of transmitting, storing, retrieving and analyzing flight data, via a communications network connecting aircraft, data and control server modules, comprising the steps of:

sending to a control server an initial handshake packet from an aircraft server upon initialization at the origin of a flight, wherein the aircraft server is configured to run off of at least one central gateway node, to connect to a communications network and to transmit and receive packets over the communications network;

receiving one or more packets at the aircraft server;

determining by the aircraft server a packet type code and a source for each of the packets received at the aircraft server, and if the packet type is an acknowledgement and route query packet sent from the control server, sending to the control server a route information packet, including one or more of a flight number, a date, an origin airport, a destination airport, a route path, an expected time of departure and a pre-calculated time of arrival, and if the packet type is a data server identification packet sent from the control server, assigning a first data server on the list of data servers as a current data server for access by the aircraft server and sending a handshake control packet and flight data packets to the current data server, and creating and recording flight data by an aircraft configured to create and record flight data;

receiving one or more packets at a data server, wherein the data server is configured to connect to a communications network and to transmit and receive packets over the communications network;

determining by the data server a packet type code and a source for each of the packets received at the data server, and if the packet type is an initial handshake packet from the control server, establishing a data server soft state for access by the aircraft server during the approximate time window, and if the packet type is an initial handshake packet from the aircraft server, sending an acknowledgement packet to the aircraft server, and if the packet type is a data packet from the aircraft server, sending an acknowledgement packet to the aircraft server, processing the message, comparing a packet sequence number to a list of packet sequence numbers previously received by the data server, and if the packet sequence number has already been received then discarding the packet, or if the sequence number has not yet been received then saving the packet data in a data server buffer memory and sending the data packet to the control server and resending the data packet to the control server until an acknowledgement packet is received from the control server for the respective data packet; and if the packet type is an end transmission packet, closing the connection with the aircraft server, sending any remaining data packets to the control server, and closing the connection with the control server once all corresponding control server acknowledgement packets have been received;

receiving one or more packets at the control server, wherein the control server is configured to connect to a communications network and to transmit and receive packets over the communications network;

determining by the control server a packet type code for each of the packets received at the control server, and if the packet type is an initial handshake control packet sent from an aircraft server, sending an acknowledgement and route query packet to the aircraft server, and resending the action query until a route information packet is received from the aircraft server, and if the packet type is a route information packet sent from the aircraft server, identifying one or more available data servers by sending an initial handshake packet, including an approximate time window for access by the aircraft server, to the data servers, selecting one or more data servers for access by the aircraft server based on one or more of specific flight routing considerations, and sending a data server identification packet, including one or more of a list of the selected data servers, an identification number for each data server and a location for each data server, to the aircraft server, and if the packet type is a data packet sent from a data server, sending an acknowledgement packet to the data server, extracting data from the packet, comparing a packet sequence number to a list of packet sequence numbers previously received by the control server and if the packet sequence number has already been received then discarding the packet and if the sequence number has not yet been received then saving the data in an integrated data archive stored on a control server buffer memory, and performing data mining on the dataset, retrieving data from the dataset, analyzing the data and determining a most likely cause of a disaster, accident or other mishap.

2. The method of claim 1, further configured to implement recovery from failure conditions, including without limitation timeouts and loss of connectivity, by execution of a server change algorithm, comprising the steps of:

assigning a first available data server as a current data server, by the aircraft server, and if there is no available data server entering a panic mode, sending a panic message to the control server, attempting to connect with a next data server on the list of data servers via satellite, and if the attempt to connect with the next data server via satellite fails, then attempting to connect with the data server following the next data server in sequential order on the list of data servers via satellite and repeating this process for all data servers included on the list of data servers until a connection is successfully made with one of the data servers, periodically sending ping message packets to the current data server and to the next data server on the list of data servers from the aircraft server via radio link, and if the packet type of a packet received at a data server is a ping message from the aircraft server, sending a ping receipt acknowledgement to the aircraft server, and if the packet type of a packet received at the aircraft server is a ping receipt acknowledgement packet sent from the current data server, and the aircraft server does not also receive a ping receipt acknowledgement packet from a next data server, maintaining an assignment of the current data server, and if the packet type of a packet received at the aircraft server is a ping receipt acknowledgement packet sent from the current data server, and the aircraft server also receives a ping receipt acknowledgement packet sent from the next data server, calculating the round trip response times of the ping receipt acknowledgement packets for both the current data server and the next data server, comparing the round trip response times of the ping receipt acknowledgement packets for the current data server and the next data server, and if the response time for the current data server is less than the response time for the next data server then maintaining an assignment of the current data server, and if the response time for the current data server is greater than the response time for the next data server, sending an end transmission packet to the current data server, reassigning the next data server as the new current data server, reassigning the data server following the next data server on the data server list as the new next data server, and sending flight data packets to the new current data server, if the packet type of a packet received at the aircraft server is a ping receipt acknowledgement packet sent from the next data server, and the aircraft server does not also receives a ping receipt acknowledgement packet from the current data server, sending an end transmission packet to the current data server via satellite, reassigning the next data server as the new current data server, reassigning the data server following the next data server on the data server list as the new next data server, and sending flight data packets to the new current data server, and repeating this process until the last data server on the data server list has been assigned as the current data server and receives an flight completion packet from the aircraft server.

3. A fault-tolerant system for distributed data transmission, storage, retrieval and analysis of aircraft flight data with aircraft, data and control server modules, comprising:
an aircraft configured to create and record flight data;
at least one aircraft server configured to run off of at least one central gateway node, to transmit and receive packets over a communications network and also to contact a control server upon initialization at the origin of a flight;
at least one data server configured to connect to the communications network and to receive and transmit packets over the communications network, wherein the at least one data server is a ground based server;
at least one control server configured to connect to the communications network and to receive and transmit packets over the communications network, wherein the at least one control server is a ground based server, is also configured to identify at least one data server available for communication with the aircraft server and is further configured to collect flight data from the data servers and to assemble and archive a flight data dataset, and wherein the flight data is provided by the aircraft server in flight data packets comprising a unique data packet header structure, wherein the at least one data server is configured to discard duplicate flight data packets based on the unique data packet header structure, and wherein the control server is configured to discard duplicate flight data packets based on the unique data packet header structure and assemble the flight data into a complete and non-redundant data set.

4. The system of claim 3, wherein the aircraft is further configured to create and record flight data for at least a set of 88 parameters mandated to be recorded by the Federal Aviation Administration.

5. The system of claim 4, wherein the aircraft server is further configured to transmit flight data packets at 1.8 Kbps of bandwidth.

6. The system of claim 3, wherein the control server is further configured to perform data mining on the dataset, retrieve data from the dataset, analyze the data retrieved and determine a most likely cause of a disaster, accident or other mishap.

7. The system of claim 3, wherein the aircraft server is configured to inform the control server of an aircraft origin airport, destination airport and route upon initialization at the origin of a flight and wherein the control server is further configured to identify the at least one data server available for communication with the aircraft server based on the aircraft origin airport, destination airport and route and also to provide a list of the available data servers with approximate times of data server availability to the aircraft server.

8. The system of claim 7, wherein one or more of the aircraft server and control server is further configured to pre-calculate a flight duration, time of aircraft entry into a data server zone, expected data volumes and estimated number of packets for a flight based on flight route, distance and expected arrival time.

9. The system of claim 3, wherein the unique data packet header structure contains a packet type code, a flight number, a departure date and a unique packet sequence number.

10. The system of claim 3, wherein the unique packet header structure is placed beneath a UDP header and reliability and fault tolerance mechanisms are implemented without use of TCP, thereby preventing large variations in rate of data transmission.

11. The system of claim 3, wherein the aircraft server is configured to connect to the communications network via one or more of a radio link and a satellite link.

12. The system of claim 11, wherein virtual data servers are used to distribute the data to the control server if the at least one central gateway node connects to the communications network via a satellite link.

13. The system of claim 3, wherein the system further includes an aircraft black box, and the unique packet header structure further includes a black box identification number.

14. The system of claim 13, wherein the aircraft server is configured to run off of the black box and to connect to the communications network via one or more of a radio link and a satellite link.

15. The system of claim 14, wherein virtual data servers are used to distribute the data to the control server if the black box connects to the communications network via a satellite link.

16. The system of claim 3, wherein the control server is located at one of the origin airport and the destination airport.

17. The system of claim 16, wherein the control server is also configured to identify and make available an array of distributed data servers on the ground located approximately 150-200 miles apart on the route.

18. The system of claim 3, wherein the data servers are configured to store backup of flight data for at least 12 to 24 hours.

* * * * *